(12) United States Patent
Bandic et al.

(10) Patent No.: US 10,243,881 B2
(45) Date of Patent: Mar. 26, 2019

(54) MULTILAYER 3D MEMORY BASED ON NETWORK-ON-CHIP INTERCONNECTION

(71) Applicant: Western Digital Technologies, Inc., Irvine, CA (US)

(72) Inventors: Zvonimir Z. Bandic, San Jose, CA (US); Luis Cargnini, San Jose, CA (US); Kurt Allan Rubin, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 45 days.

(21) Appl. No.: 14/924,670

(22) Filed: Oct. 27, 2015

(65) Prior Publication Data
US 2017/0118111 A1    Apr. 27, 2017

(51) Int. Cl.
*H04L 12/931*    (2013.01)

(52) U.S. Cl.
CPC ..................... *H04L 49/00* (2013.01)

(58) Field of Classification Search
CPC ........................................................ H04L 49/00
See application file for complete search history.

(56) References Cited

U.S. PATENT DOCUMENTS

| | | | |
|---|---|---|---|
| 6,968,394 B1 | 11/2005 | El-Rafie | |
| 7,772,880 B2 | 8/2010 | Solomon | |
| 7,978,693 B2 | 7/2011 | Dielissen | |
| 8,386,690 B2 | 2/2013 | Li et al. | |
| 8,391,281 B2 | 3/2013 | Paul | |
| 8,442,057 B2 | 5/2013 | Howe et al. | |
| 8,443,144 B2 | 5/2013 | Yim et al. | |
| 8,719,753 B1 | 5/2014 | Chow et al. | |
| 8,819,616 B2 | 8/2014 | Philip et al. | |

(Continued)

FOREIGN PATENT DOCUMENTS

| JP | 2015035117 | 2/2015 |
|---|---|---|
| KR | 101028806 | 4/2011 |

OTHER PUBLICATIONS

Design and Management of 3D Chip Multiprocessors Using Network-in-Memory <http://dl.acm.org/citation.cfm?id=1136497>.

(Continued)

*Primary Examiner* — Chirag G Shah
*Assistant Examiner* — Joshua Smith
(74) *Attorney, Agent, or Firm* — Stoel Rives LLP

(57) ABSTRACT

Embodiments described herein generally relate to the use of three-dimensional solid state memory structures, both volatile and non-volatile, utilizing a Network-on-Chip routing protocol which provide for the access of memory storage via a router. As such, data may be sent to and/or from memory storage as data packets on the chip. The Network-on-Chip routing protocol may be utilized to interconnect unlimited numbers of three-dimensional memory cell matrices, spread on a die, or multiple dies, thus allowing for reduced latencies among matrices, selective power control, unlimited memory density growth without major latency penalties, and reduced parasitic capacitance and resistance. Other benefits include a reduction in total density as compared to two-dimensional solid state memory structures utilizing a Network-on-Chip routing protocol, improved signal integrity, larger die areas, improved bandwidths and higher frequencies of operation.

34 Claims, 7 Drawing Sheets

(56) References Cited

U.S. PATENT DOCUMENTS

| | | | |
|---|---|---|---|
| 9,443,561 B1* | 9/2016 | Roberts | G06F 13/42 |
| 9,652,425 B2 | 5/2017 | Chen et al. | |
| 9,699,079 B2 | 7/2017 | Chopra et al. | |
| 2002/0184419 A1 | 12/2002 | Creedon et al. | |
| 2003/0075797 A1* | 4/2003 | Suzuki | G11C 11/005 257/734 |
| 2004/0100832 A1* | 5/2004 | Nakajima | G11C 11/16 365/200 |
| 2008/0005402 A1 | 1/2008 | Kim et al. | |
| 2011/0235531 A1 | 9/2011 | Vangal et al. | |
| 2011/0320719 A1 | 12/2011 | Mejdrich et al. | |
| 2012/0159496 A1 | 6/2012 | Dighe et al. | |
| 2013/0083794 A1 | 4/2013 | Lakshmanamurthy et al. | |
| 2013/0188536 A1 | 7/2013 | Pirskanen et al. | |
| 2013/0285739 A1* | 10/2013 | Blaquiere | G01B 31/318555 327/565 |
| 2014/0156929 A1 | 6/2014 | Falsafi et al. | |
| 2014/0204735 A1* | 7/2014 | Kumar | H04L 47/12 370/229 |
| 2014/0310467 A1 | 10/2014 | Shalf et al. | |
| 2014/0328208 A1* | 11/2014 | Norige | H04L 45/06 370/254 |
| 2014/0376569 A1 | 12/2014 | Philip et al. | |
| 2015/0016172 A1* | 1/2015 | Loh | G06F 12/02 365/51 |
| 2015/0109024 A1* | 4/2015 | Abdelfattah | G06F 17/5054 326/41 |
| 2015/0220470 A1 | 8/2015 | Chen et al. | |

OTHER PUBLICATIONS

Novel 3D memory-centric NoC architecture for transaction-based SoC applications <http://ieeexplore.ieee.org/xpl/login.jsp?tp=&arnumber=5876934>.

Three-dimensional image processing VLSI system with network-on-chip system and reconfigurable memory architecture <http://ieeexplore.ieee.org/xpl/login.jsp?tp=&arnumber=6018893>.

Network-on-SSD: A Scalable and High-Performance Communication Design Paradigm for SSDs <http://cs.ipm.ac.ir/~tavakkol/downloads/papers/A.Tavakkol-CAL2013.pdf>.

Three-Dimensional Network-on-Chip Architecture <http://link.springer.com/chapter/10.1007/978-1-4419-0784-4_8>.

A 0.9 pJ/bit, 12.8 GByte/s WideIO memory interface in a 3D-IC NoC-based MPSoC <http://ieeexplore.ieee.org/xpl/login.jsp?tp=&arnumber=6576608>.

Illuminating Future 3D Architectures With Optical Networks-On-Chip <http://www.leti-innovationdays.com/presentations/D43DWorkshop/Session7-DesignStrategiesFor3D/D43D13_Session_7_3_DavideBertozzi.pdf>.

Network Main Memory Architecture for NoC-Based Chips, <http://ieeexplore.ieee.org/xpl/articleDetails.jsp?tp+&arnumber=5578270>.

Bandic, et al., Office Action dated Jul. 14, 2017 for U.S. Appl. No. 14/922,547.

Bandic, et al., Office Action dated May 16, 2018 for U.S. Appl. No. 14/922,547.

Kumar, et al., A Network on Chip Architecture and Design Methodology, Laboratory of Electronics and Computer Systems, Dept of Microelectronics and information Technology, Royal Institute of Technology, Stockholm, Sweden; VTT Electronics, Finland; Spirea AB, Stockholm, Sweden, (Joint Finnish-Swedish EXSITE research program).

Srinivasan, et al., A Memory Subsystem Model for Evaluating Network-on-Chip Performance, https:/www.design-reuse.com/articles/25029/memory-subsystem-model-noc-performance.html, accessed on May 31, 2018.

* cited by examiner

MULTILAYER 3D MEMORY BASED ON NETWORK-ON-CHIP INTERCONNECTION

BACKGROUND OF THE DISCLOSURE

Field of the Disclosure

Embodiments of the present disclosure generally relate to data and memory storage systems, and more particularly, to a memory device utilizing a three-dimensional Network-on-Chip routing protocol for the interconnection of memory subarrays, mats, arrays, subbanks, and/or banks.

Description of the Related Art

The cerebral cortex of a computer is a magnetic recording device, which typically may include a rotating magnetic media or a solid state volatile or non-volatile media device. A number of different technologies exist today for storing information for use in a computing system.

In recent years, there has been a demand for higher density devices—volatile and non-volatile—which maintain a relatively low cost per bit, for use in high capacity storage applications. Today the memory technologies that generally dominate the computing industry are DRAM and NAND flash; however, these memory technologies may not be able to address the current and future capacity or energy demands of next generation computing systems.

Existing non-volatile memory bank architecture employs a classic fabric routing methodology, which has been widely adopted in SRAM, DRAM, FLASH, MRAM, PCM, and ReRAM, as well as with HMC memory banks HMC memory banks utilize Through-Silicon-Via (TSV) to interconnect stacked dies with a Network-on-Chip-like protocol to access the many dies. However, each die is a classic DRAM die based on traditional H-Tree routing techniques to route the many subarrays. This classic methodology limits the density and amount of memory cells that may be included in a single die as well as the amount of bandwidth and access points to the same memory bank.

Traditionally, memory banks are architectured and organized as banks comprising arrays of subbanks. Each subbank may comprise multiple MATs. Each MAT may be composed of four or more subarrays and predecoding logic. As such, H-Tree routing may be used to route the I/O of the subarrays across the die vertically and horizontally. However, approximately 60% to 80% of the area is utilized to interconnect the subarrays; therefore, the majority of the surface of the memory is logic interconnection and not memory. As such, the biggest limitation with existing memory bank architecture is the amount of wire necessary to route the entire memory. Excessive amount of wire is the main cause for latency in existing memory banks from SRAM to DRAM. Given the physical limitations of traditional memory banks, subarrays share wordlines to write and read. As such, each bank can only access one subarray at a given time. With such limitations, there may only be one physical access interface, due to complexity and cost, to implement additional interfaces.

Hence, there is a need in art for an improved memory device that utilizes an improved three-dimensional routing protocol, allowing for access to any given subarray in parallel while improving total density and bandwidth. Furthermore, there is a need in the art for an improved three-dimensional apparatus and method for routing memory banks without employing a majority of the die for routing.

SUMMARY OF THE DISCLOSURE

The present disclosure generally relates to the use of three-dimensional solid state memory structures, both volatile and non-volatile, utilizing a Network-on-Chip routing protocol which provide for the access of memory storage via a router. As such, data may be sent to and/or from memory storage as data packets on the chip. The Network-on-Chip routing protocol may be utilized to interconnect unlimited numbers of three-dimensional memory cell matricies, spread on a die, or multiple dies, thus allowing for reduced latencies among matricies, selective power control, unlimited memory density growth without major latency penalties, and reduced parasitic capacitance and resistance. Other benefits include an increase in total density as compared to two-dimensional solid state memory structures utilizing a Network-on-Chip routing protocol, improved signal integrity, larger die areas, improved bandwidths and higher frequencies of operation.

In one embodiment, a three-dimensional memory device is disclosed. The three-dimensional memory device includes a first die, a second die, and a plurality of links. The first die includes a plurality of memory arrays. The second die includes a plurality of routers. Each router is operatively connected to at least one memory array via a link. Each router includes data packet switching logic and at least one aggregator. The at least one aggregator is operatively connected with the data packet switching logic. The plurality of links interconnect each router in a Network-on-Chip routing protocol.

In another embodiment, a multi-layer memory device is disclosed. The multilayer memory device includes two or more first die, a second die, and a second plurality of links for operatively connecting the two or more first die and the second die. Each first die includes a plurality of memory arrays. The two or more first die are each superposed on a first side of the second die. The second die includes a plurality of routers operatively connected via a first plurality of links in a Network-on-Chip routing protocol. Each router includes data packet switching logic and at least one aggregator. The aggregator is operatively connected with the data packet switching logic.

In another embodiment, a memory device is disclosed. The memory device includes a plurality of memory layers. Each memory layer includes a first layer and a second layer. The first layer includes a plurality of routers. Each router is operatively connected to at least one other router of the plurality of routers via a link in a Network-on-Chip routing protocol. Each router includes data packet switching logic and at least one aggregator operatively connected with the data packet switching logic. The second layer includes a plurality of memory arrays. Each router is operatively connected to at least one memory array with a link. The first layer is superposed by the second layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments disclosed herein generally relate to the use of three-dimensional solid state memory structures, both volatile and non-volatile, utilizing a Network-on-Chip routing protocol which provide for the access of memory storage via a router. As such, data may be sent to and/or from memory storage as data packets on the chip. The Network-on-Chip routing protocol may be utilized to interconnect unlimited numbers of three-dimensional memory cell matricies, spread on a die, or multiple dies, thus allowing for reduced latencies among matricies, selective power control, unlimited memory density growth without major latency penalties, and reduced parasitic capacitance and resistance. Other benefits include a reduction in total density as compared to two-dimensional solid state memory structures utilizing a Network-on-Chip routing protocol, improved signal integrity, larger die areas, improved bandwidths and higher frequencies of operation.

In the following description of aspects of the present disclosure, reference is made to the accompanying drawings that form a part hereof, and in which is shown by way of illustration of the specific implementations in which the disclosure may be practiced. It should be noted that the figures discussed herein are not drawn to scale and do not indicate actual or relative sizes. Any hatching in the figures is used to distinguish layers and does not represent the type of material used.

Figure 1A:
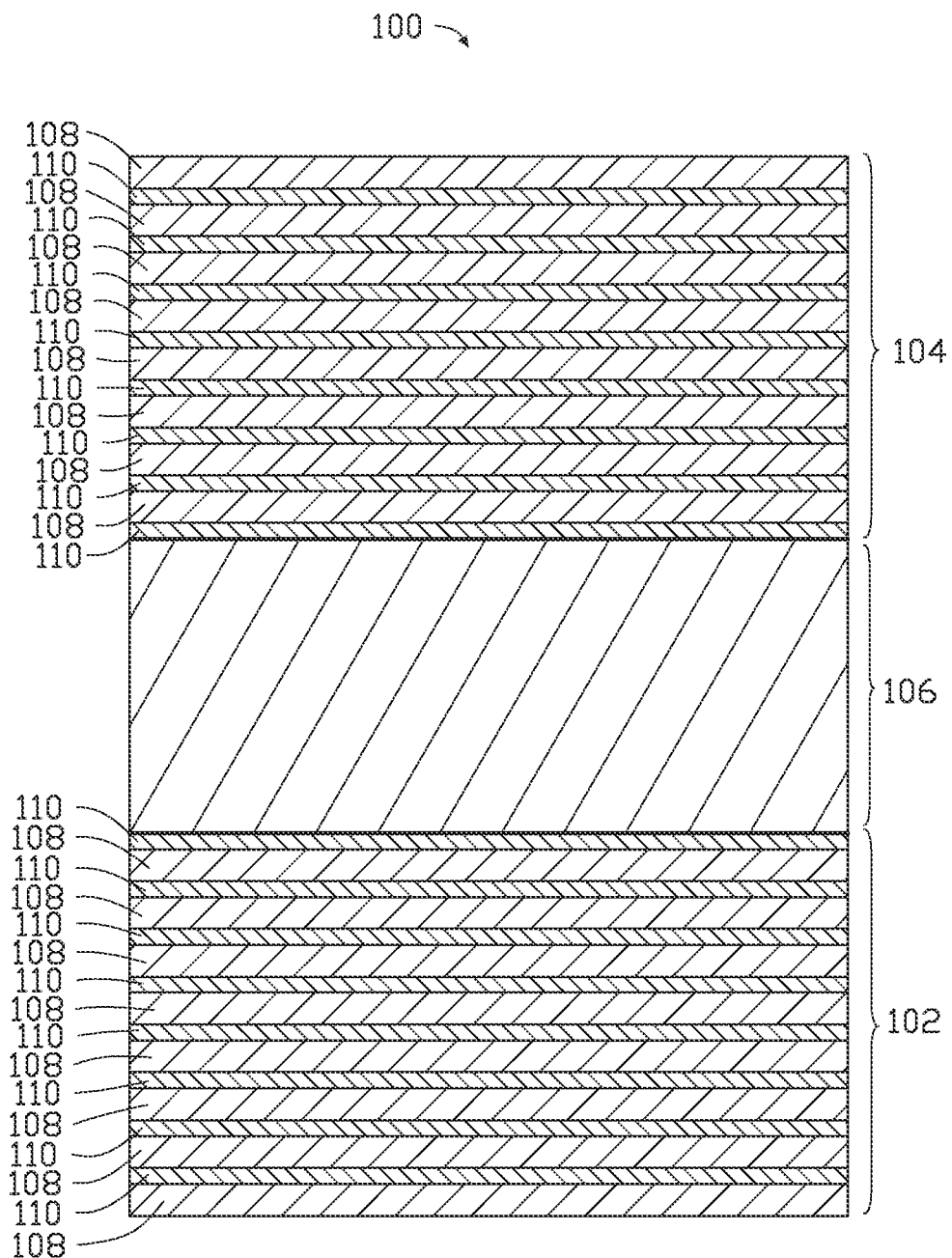
FIG. 1A illustrates architecture of a memory array of a conventional memory device.

FIG. 1A illustrates the architecture of conventional memory banks 102, 104 of a memory device 100 as known in the art. As shown, the memory device 100 may include a first memory bank 102 and a second memory bank 104 operatively connected by interface logic 106. In certain embodiments, the first memory bank 102 and/or the second memory bank may be a subbank. It is contemplated, however, that more memory banks may be utilized within the memory device 100, wherein each memory bank may be connected by interface logic. The first memory bank 102 and the second memory bank 104 may each comprise a plurality of subarrays 108. In certain embodiments, the first memory bank 102 and the second memory bank 104 may each comprise a plurality of subbanks (not shown). Each subarray 108 may be a subarray of memory cells. Interconnectors 110 may separate each subarray 108 within each of the first memory bank 102 and the second memory bank 104. The interconnectors 110 may be wires dedicated to the routing of the entire memory device 100. As shown, approximately about 60% to about 80% of the area of each of the first memory bank 102 and the second memory bank 104 is dedicated to interconnectors 110.

A drawback of existing memory bank architecture, such as the architecture of the first memory bank 102 and the second memory bank 104 of FIG. 1A, is the amount of wire necessary to route the entire memory device 100. As such, a main cause of latency in existing memory banks, such as those of the first memory bank 102 and the second memory bank 104, is the amount of wire regardless of the type of device (for example, SRAM, DRAM, etc.). As such, a challenge exists in determining the tradeoff between power, area, and latency within such memory devices.

Figure 1B:
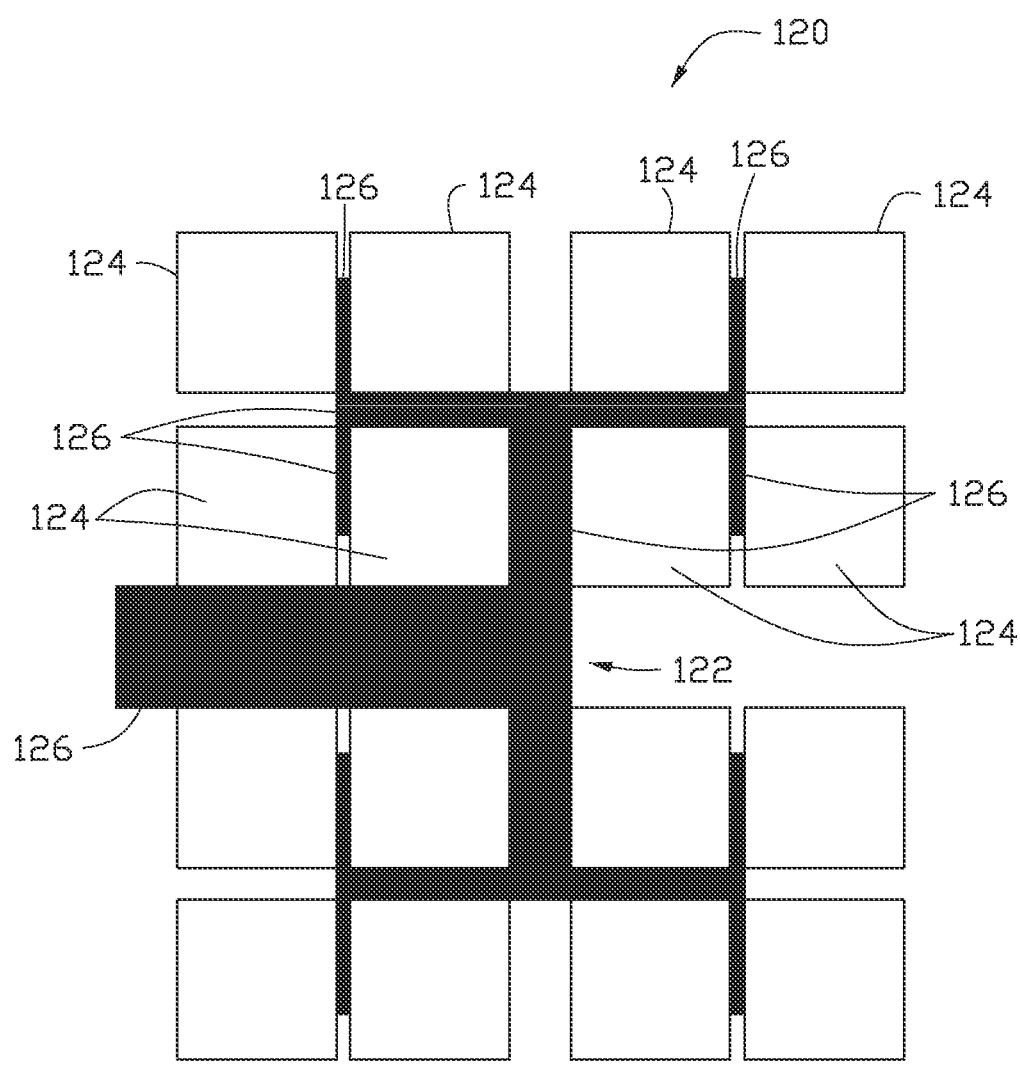
FIG. 1B illustrates an overview of memory bank architecture utilizing a conventional H-Tree technique.

FIG. 1B illustrates another embodiment of a conventional memory bank architecture scheme 120 utilizing an H-Tree routing layout 122. Conventional memory banks may include banks of memory (not shown), each bank being divided into arrays of subbanks (not shown). Each subbank may be further divided into multiple MATs (not shown), and each MAT may be composed of four or more subarrays 124. Each subarray 124 may include predecoding logic (not shown), 2-D memory array cells (not shown), row and column decoders (not shown), wordline drivers (not shown), bitline muxers (not shown), sense amplifiers (not shown), and/or output drivers (not shown). Each element of each subarray 124 may be interconnected with the I/O interface (not shown).

Each subarray 124 may be connected within the conventional memory bank architecture scheme 120 via wire 126. A conventional memory bank architecture scheme 120 utilizing a line size of eight words of 64 bits maintains a total of 512 bits, or metal tracks. As such, collectively, each conventional memory bank architecture scheme 120 may utilize over 8,000 wires 126 to interconnect each subarray 124 therewithin. The utilization of H-Tree routing layout 122 necessitates that power is constantly applied to the entire H-Tree.

The conventional memory bank 102, 104 of FIG. 1A may generally assume the H-Tree routing layout 122. As discussed, supra, the use of the H-Tree routing layout 122 may utilize between about 60% and about 80% of the space of the memory device 100 for routing wires 126 and I/O fabric interconnection.

Figure 2A:
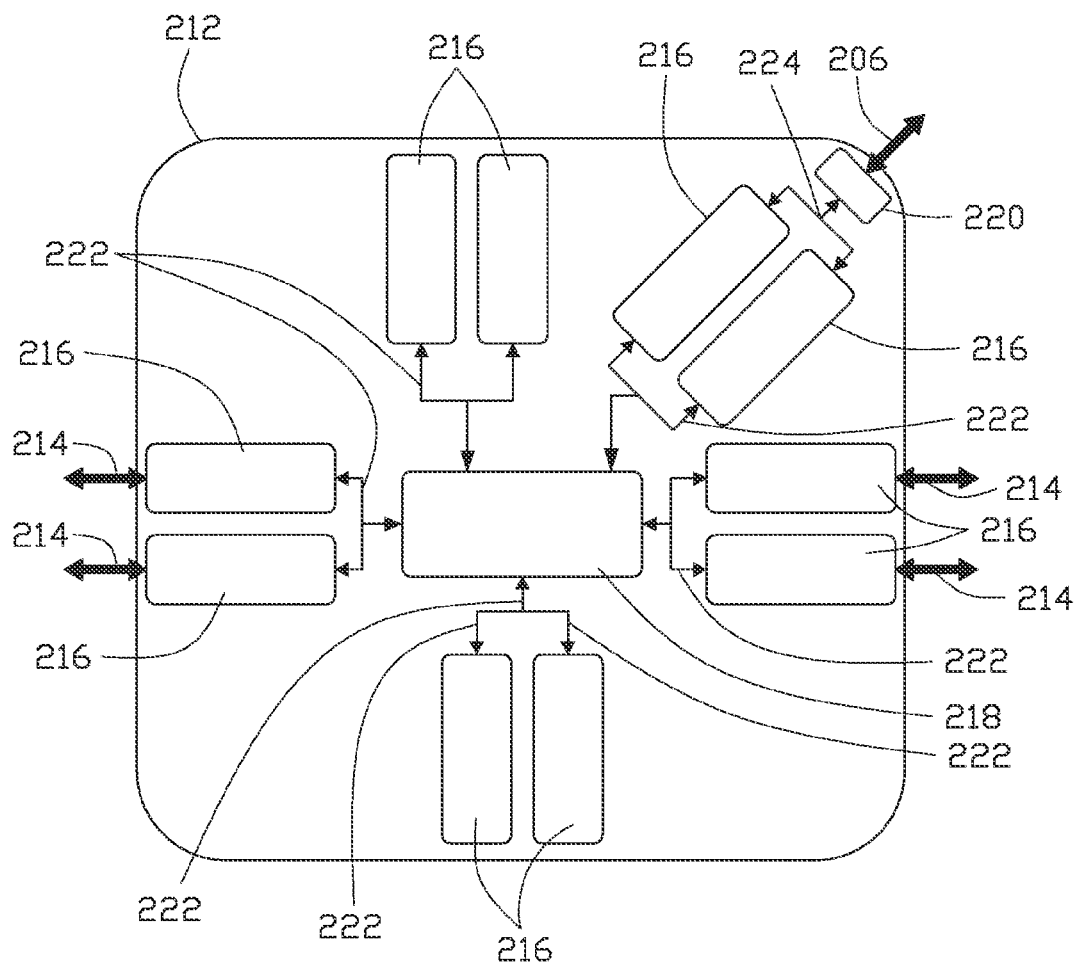
FIG. 2A illustrates a router according to one embodiment described herein.

FIG. 2A illustrates a router 212, according to one embodiment described herein. Each router 212 may include a plurality of first in-first out devices (FIFOs) 216, data packet switching logic 218, and/or a least one aggregator 220. Each FIFO 216 may allow for the individual breaking of clock domains across multiple channels. Each FIFO 216 may organize and/or manipulate a data buffer such that the first entry received is the processed first. In some embodiments, the plurality of FIFOs 216 may be at least six FIFOs 216. In another embodiment, the plurality of FIFOs 216 may be ten FIFOs 216. It is contemplated however, that any number of FIFOs 216 may be utilized. Each channel may be a full-duplex path, including an input and an output interface. The input and output interface may be able to send and receive data in parallel. Each transmitter interface may be operatively connected with a FIFO 216. Each receiver interface may be operatively connected with a FIFO 216. As such, the communication may occur across the FIFOs 216, thus completely separating the internals of each router 212. Each FIFO 216 may be operatively connected to an adjoining FIFO 216 as a pair of FIFOs 216 via a first interconnector 222. In some embodiments, the first interconnector 222 may be wire. Furthermore, each FIFO 216 may be operatively connected to the data packet switching logic 218 via the first interconnector 222. In some embodiments, each router 212 may further include data packet switching logic 218. Each channel may be operated at an independent operating frequency or clock. Furthermore, each channel may be a full-duplex channel. Each channel may be operated on a different bandwidth. A first link 206 may operatively connect each router 212 to a memory array 210 (See, infra). Furthermore, a second link 214 may connect adjacent routers (See, infra).

The use of a FIFO 216 may allow for the breaking of clock domains one-by-one completely independently across various channels. As such, a full duplex channel may operate in different bandwidths and/or operating frequencies. Furthermore, each channel may operate in different and independent frequencies. The use of a FIFO 216 may allow for an EDA tool to route a Clock Tree Synthesis with improved performance and/or improved signal to noise ratio. Additionally, each FIFO 216 may be implemented with non-volatile and/or volatile technology, for example, SRAM and/or MRAM. Furthermore, the internal logic of the router 212, data packet switching logic 218, and aggregator 220 may operate in different clock-domains. The different clock domains may be on different and/or multiple frequencies. In another embodiment, the different clock domains may be aligned out of phase. As such, future expansion of the design into GaLs (Globally Asynchronous Locally Synchronous) may be permitted.

As further shown in FIG. 2A the router 212 may further include an aggregator 220. Although one aggregator 220 is shown, it is contemplated that any number of aggregators 220 may be utilized. Although one aggregator 220 is shown, it is contemplated that any number of data packet switching logics 218 may be utilized and/or operatively connected to or with the aggregator 220. The aggregator 220 may be connected to at least one FIFO 216 via a second interconnector 224, such that the at least one FIFOs 216 are between the data packet switching logic 218, or multiple data packet switching logics 218, and the aggregator 220. The aggregator 220 may be operatively connected with the data packet switching logic 218. In some embodiments the second interconnector 224 may be wire. In certain embodiments, the FIFOs 216 may be connected to the aggregator 220, such that the at least one FIFOs 216 is between the aggregator 220 and the data packet switching logic 218. In certain embodiments, the aggregator 220 may be connected to some or all of the FIFOs 216 of the router 212. The aggregator 220 may translate from the Network-on-Chip routing protocol between the router 212 and the memory array 210. In certain embodiments, the aggregator 220 may concentrate multiple channels.

Furthermore, the aggregator 220 may be operatively connected to a memory array 210. In some embodiments, the connection between the aggregator 220 and the FIFOs 216 may allow for access to the memory array 210. In certain embodiments, the aggregator 220 may perform translations between a network channel and the memory array 210. In other embodiments, the aggregator 220 may perform translations between multiple network channels and the memory array 210. In one embodiment, the aggregator 220 may be connected to the FIFOs 216 connected to the memory array 210.

Each memory array 210 may be accessed via the router 212. In certain embodiments, each memory array 210 may be accessed via a respective router 212, such as a router operatively connected with the memory array 210. Data packets (not shown) may be fragmented, such that data may be sent to and from the memory array 210 via the router 212 and/or the plurality of first links 206 as a fragmented data packet. For example, 64 bits may be broken into four packets of 16 bits or eight packets of eight bits. The same path need not be followed to send each data packet to its destination. As such, four clock cycles plus hops are needed to transit the data packet across the network to read or write the memory in any position.

Figure 2B:
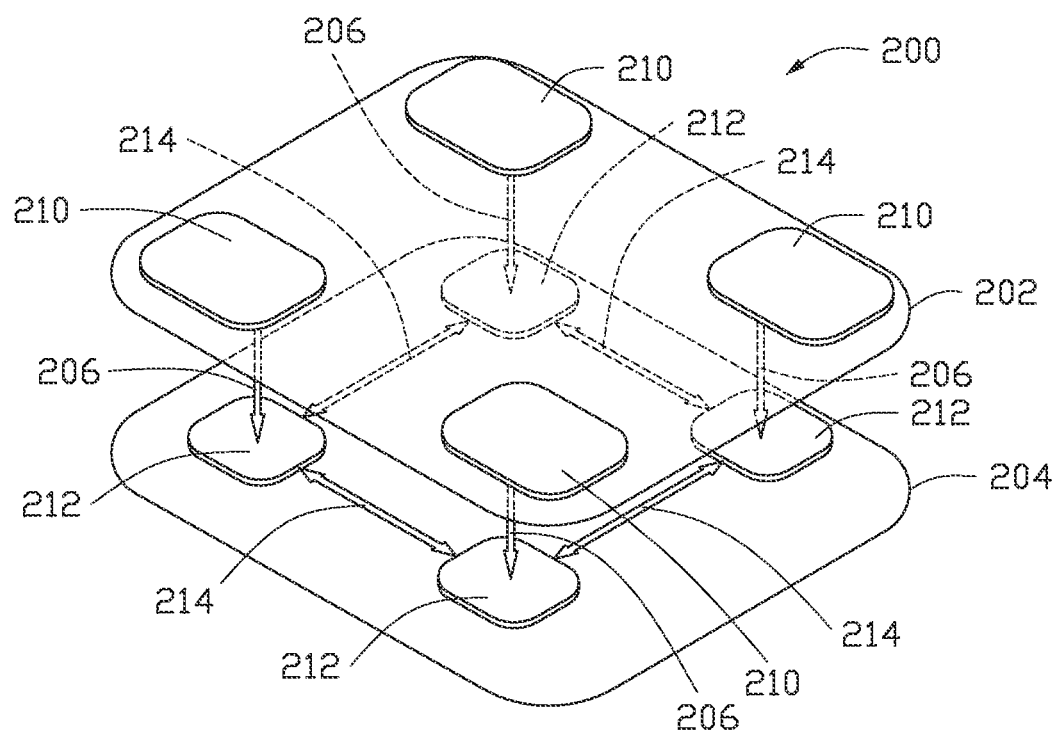
FIG. 2B illustrates a three-dimensional solid state memory structure utilizing a Network-on-Chip routing protocol with a memory array on a different layer than a router according to one embodiment described herein.
Figure 2C:
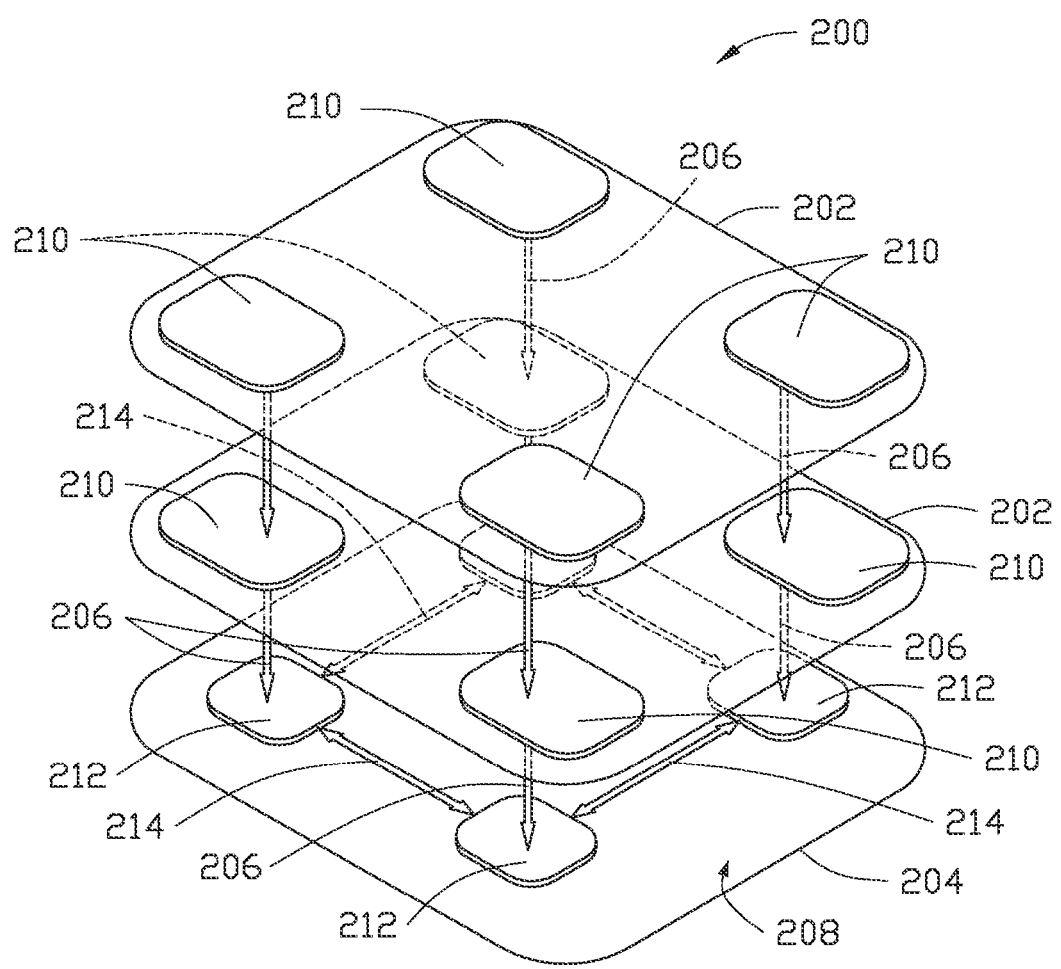
FIG. 2C illustrates a three-dimensional solid state memory structure utilizing a Network-on-Chip routing protocol with a plurality of three-dimensionally stacked memory arrays on different layers than a router according to one embodiment described herein.
Figure 2D:
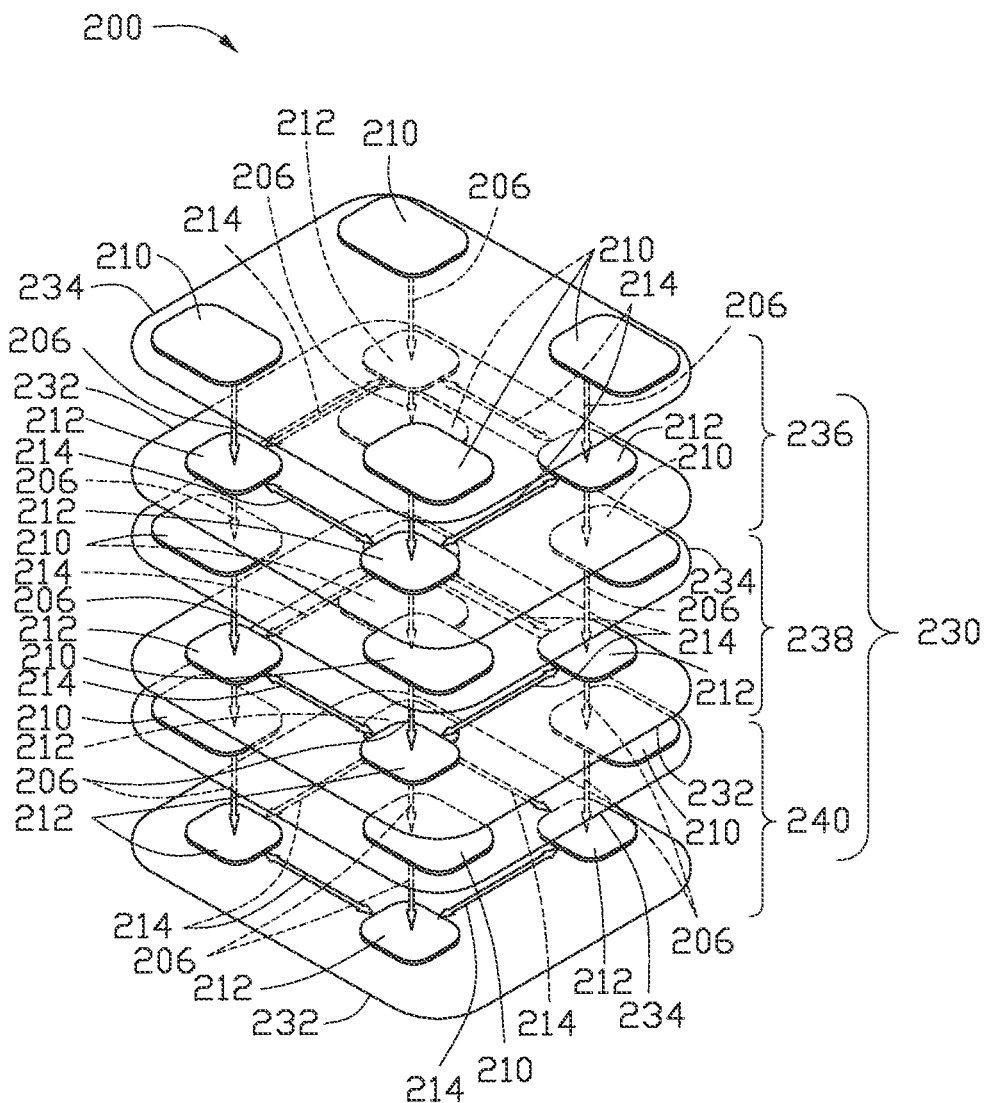
FIG. 2D illustrates a three-dimensional solid state memory structure utilizing a Network-on-Chip routing protocol with a plurality of memory layers according to one embodiment described herein.

FIG. 2B, FIG. 2C, and FIG. 2D each illustrates an embodiment of a memory device 200 utilizing a Network-on-Chip routing protocol. The memory device 200 may be a three-dimensional memory device and/or a multilayer memory device. In certain embodiments, the memory device 200 may be a solid-state memory device. The use of Network-on-Chip routing protocol may allow for the interconnection of an unlimited number of stacked memory layers, in a three-dimensional fashion, including routers 212 and memory arrays 210. As such, the final density of a memory bank and associated latencies may be predicted beforehand. The Network-on-Chip routing protocol may be an interconnected memory cell matrix. In certain embodiments, the Network-on-Chip routing protocol may support silicon implementation of a three-dimensional structure of the topology.

FIG. 2B illustrates an embodiment of a three-dimensional memory device 200. As shown, each memory device 200 may include a first die 202, a second die 204, and/or a plurality of second links 214. The first die 202 may include a plurality of memory arrays 210. In some embodiments, the plurality of memory arrays 210 may be a plurality of intellectual property (IP) cores. The second die 204 may include a plurality of routers 212. A plurality of first links 206 may interconnect a router 212 of the second die 204 with a memory array 210 of the first die 202. In some embodiments, the plurality of first links 206 may operatively connect at least one router 212 of the second die 204 and at least one memory array 210 of the first die 202. In some embodiments the plurality of first links 206 may be wire. The plurality of second links 214 may interconnect each router 212 of the second die 204 in a Network-on-Chip routing protocol. In some embodiments the plurality of second links 206 may be wire. As such, each router 212 may be operatively connected to at least one other router 212 of the second die 204 via the second link 214, such as an adjacent router 212. In some embodiments, each router 212 may be operatively connected to at least one other adjacent router 212 of the second die 204 via the second link 214. Each router 212, as described with reference to FIG. 2A supra, may include a plurality of FIFOs 216, data packet switching logic 218, and/or a least one aggregator 220. Each FIFO 216 may allow for the individual breaking of clock domains across multiple channels. The at least one aggregator 220 may be operatively connected with the data packet switching logic 218 and/or the at least one FIFO 216.

Furthermore, the interconnection of the first die 202 and the second die 204 of the memory device 200 may be in a stacked formation such that the first die 202 is stacked above and/or below the second die 204. The first die 202 may be superposed by the second die 204 such that the first die 202 and the second die 204 are coplanar in a first plane. As such, the stacking of the first die 202 and the second die 204 is three-dimensional. Each memory array 210 may be in parallel within the first die 202. Furthermore, in some embodiments, each memory array 210 may maintain a unique channel.

The memory device 200 of FIG. 2B maintains an increased memory density as compared to conventional memory devices (See FIGS. 1A, 1B, supra) while maintaining a reduction in the total die surface. Although four memory arrays 210 and four routers 212 are shown in FIG. 2B, it is contemplated that any number of memory arrays 210 and any number of routers 212 may be utilized.

FIG. 2C illustrates another embodiment of a memory device 200 utilizing a Network-on-Chip routing protocol. As shown in FIG. 2C, the memory device 200 may be a multilayer memory device 200. The memory device 200 may include two or more first die 202, a second die 204, and a first plurality of links 206 for connecting the two or more first die 202 and the second die 204. Each first die 202 may include a plurality of memory arrays 210. The second die 204 may include a plurality of routers 212 operatively connected via a second plurality of links in a Network-on-Chip routing protocol. Each router 212 may include a plurality of FIFOs 216, data packet switching logic 218, and/or at least one aggregator 220. Each router 212 may be operatively connected with at least one adjacent router 212 of the second die 204. The aggregator 220 may be operatively connected to at least one FIFO 216. The two or more first die 202 may each be superposed on a first side 208 of the second die 204. In some embodiments the two or more first die 202 and the second die 204 may be stacked in a common plane.

The two or more first die 202 and the second die 204 of the multilayer memory device 200 of FIG. 2C may share the same communication channel. However, in some embodiments the memory device 200 of FIG. 2C may use a broadcast protocol, as the memory device 200 is based on a Network-on-Chip routing protocol. In some embodiments, each first die 202 may be accessed independently. Furthermore, each first die 202 may be powered independently.

Although eight memory arrays 210 and four routers 212 are shown in FIG. 2C, it is contemplated that any number of memory arrays 210 and any number of routers 212 may be utilized and/or within the respective first die 202 and/or second die 204. Each memory array 210 may be in parallel within the first die 202. Furthermore, each memory array 210 may maintain a unique channel. In some embodiments, the two or more first die 202 and the second die 204 may share the same communication channel.

FIG. 2D illustrates an embodiment of memory device 200 utilizing a Network-on-Chip routing protocol. The memory device 200 may include a plurality of memory layers 230. Each memory layer 230 may include a first layer 232 and a second layer 234. The first layer 232 may be superposed by the second layer 234.

In some embodiments, the first layer 232 may be a fabric interconnection die. The first layer 232 may include a plurality of routers 212. Each router may be operatively connected to at least one other router 212 of the plurality of routers 212 via a second link 214 such that the routers are in a Network-on-Chip routing protocol. Each router 212 may include a plurality of FIFOs 216, data packet switching logic 218, and/or at least one aggregator 220. Each router 212 may implement multiple channels. In certain embodiments, each router 212 of the first layer 232 may implement an upper channel and a lower channel. The at least one aggregator 220 may be operatively connected to at least one FIFO 216. In some embodiments, multidirectional access may be had such that all layers can access layers above and below.

In some embodiments, the second layer 234 may be a memory array matricies die. The second layer 234 may include a plurality of memory arrays 210. Each router 212 may be operatively connected to at least one memory array 210 with a first link 206. Each router 212 of the first layer 232 may be operatively connected with at least one memory array 210 of a different memory layer 230.

In certain embodiments, the plurality of memory layers 230 may be more than two memory layers 230. As such, by way of example only, the plurality of memory layers 230 may include at least a first memory layer 236, a second memory layer 238, and a third memory layer 240. The second memory layer 238 may be between the first memory layer 236 and the third memory layer 240. Each router 212 of the first memory layer 236, the second memory layer 238, and the third memory layer 240 may be operatively connected with at least one other router 212 of the plurality of routers 212 across the plurality of memory layers 230. The plurality of routers 212 of the second memory layer 238 may be operatively connected with at least one memory array 210 of the second memory layer 238 and at least one memory array 210 of the third memory layer 240. The plurality of memory arrays 210 of the second memory layer 238 may be operatively connected with at least one router 212 of the second memory layer 238 and at least one router 212 of the first memory layer 236. The first memory layer 236 may be superposed by the second memory layer 238. The second memory layer 238 may be superposed by the third memory layer 240.

Although twelve memory arrays 210 and twelve routers 212 are shown in FIG. 2D, it is contemplated that any number of memory arrays 210 and any number of routers 212 may be utilized. Furthermore, although three memory layers 230 are shown in FIG. 2D, it is contemplated that any number of memory layers 230 may be utilized. Furthermore, although each memory layer 230 of FIG. 2D is shown with four memory arrays 210 and four routers 212, it is contemplated that any number of memory arrays 210 and any number routers 212 may be utilized in each memory layer 230.

In each of FIG. 2B, FIG. 2C, and FIG. 2D, each router 212 may be operatively connected to at least one memory array 210 via the first link 206. As such, each memory array 210 may be accessed via the router 212 connected thereto.

In each embodiment of FIG. 2B, FIG. 2C, and FIG. 2D, the routers 212 may be located at grid points where data packets or message packets may change directions on an X-Y-Z plane (which may correspond to north, south, east, west, up, and down directions) and/or exit to host blocks on the Network-on-Chip routing protocol. As such, routers 212 may be utilized when data packets need to switch from one router 212 and/or memory array 210 location to another router 212 and/or memory array 210 location on the path of the data packet. A router 212 may be utilized at points where data packets from multiple input links may meet and contend for a common output link.

Each router 212 may be sequentially accessed across a path of a data packet (not shown) without supplying power to the entire memory device 200.

It is contemplated that, in certain embodiments, the memory device 200 may include two or more layers (e.g., an upper layer and a bottom layer) that are not dies. In some embodiments, an upper layer and a lower layer may be included. The layers may be stacked in the manners described herein, and may further repeat the patterns of the lower layer to create a monolithic three-dimensional element, which may be similar to a die. Data packets may be exchanged via a data packet exchange hop from the upper layer to the bottom layer and/or from the bottom layer to the upper layer. As such, there may be no direct connection from the I/O interface, as only data packets may be exchanged across the network, except in embodiments in which a channel of super-high priority is created in which there is a single position FIFO to maintain the element of clock domain dissociation.

The amount of memory available to each router 212 may define the range of addresses for the router 212. To accommodate the Network-on-Chip routing protocol, each router 212 may have a range of addresses, rather than a single address. As such, in some embodiments, each router 212 may have a unique range of addresses rather than X and/or Y coordinates. In certain embodiments, the unique range of addresses for each router 212 may be a unique address. In some embodiments, the range of addresses for each router 212 may be a sequential range of addresses. In some embodiments, the range of addresses for each router 212 may not be a sequential range of addresses, depending on the chosen organization. Additionally, each memory array 210 may have a unique address and/or a unique range of addresses rather than X and/or Y coordinates. The range of addresses for each memory array 210 may be a sequential range of addresses, as each memory array 210 is a linear sequence of memory addresses.

As such, a data packet (not shown) may be sent to an address. Each router 212 may have a range of addresses that are defined by the amount of memory available therein, such as within the attached memory array 210. As such, each router 212 and attached memory array 210 may be, by way of example only, 1024 lines or 2048 lines, independently, in the same design. Therefore, the data packet switching logic 218 may match a row and column to a field of the data packet and send the data packet to a local port connected with a memory array 210. In certain embodiments, a calculation may be performed and the result compared to the properties of the router 212 and attached memory arrays 210. If the addressing of the row is larger and/or smaller than the router 212 and attached memory array 210, the data packet may be routed north and/or south. If the addressing of the column is larger and/or smaller than the router 212 and attached memory array 210, the data packet may be routed east and/or west. Furthermore, if the addressing layer is larger or smaller, the data packet may be routed up and/or down. As such, the topology may enforce the address routing mechanism on the network. The data packet switching logic 218 may perform a calculation to verify that the data packet address is inside a range of the global space. If the data packet address is not within the range of the global space, multiple different routing algorithms may be calculated on the fly to reroute the data packet. If a match of the address is subtracted from the base address, the address inside of the memory array range may be connected to the local port. If a match of the address is not subtracted from the base address, the data packet may be routed to another port. The decision of which port may depend on the topology of the memory device and a routing table. Additionally, the Network-on-Chip routing protocol may be built in any shape, without modifying or correcting the addressing logic.

Figure 2E:
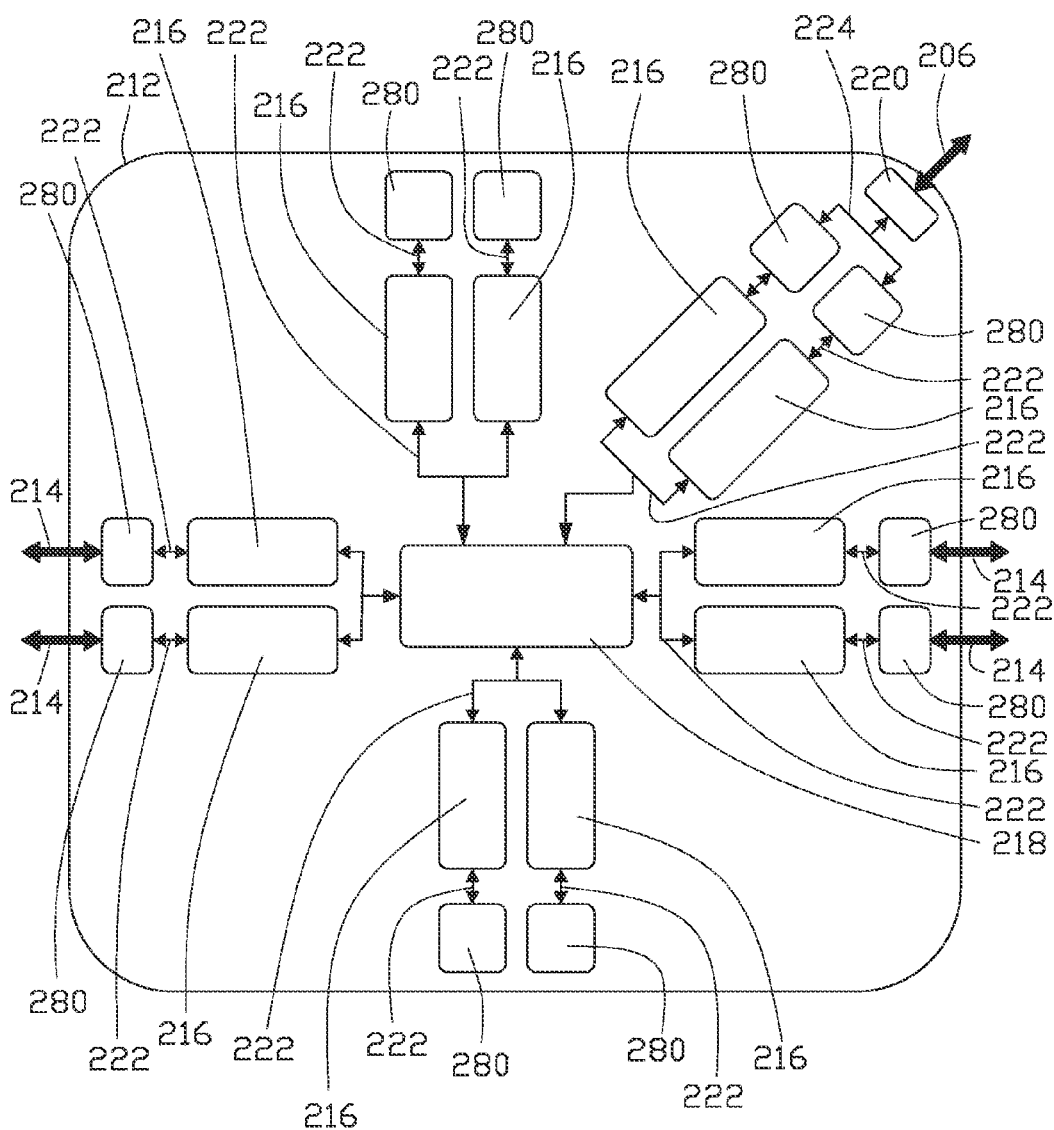
FIG. 2E illustrates a router according to one embodiment described herein.

In certain embodiments, the multi-layer memory device 200 may further include a plurality of modulators and/or a plurality of demodulators. FIG. 2E illustrates another embodiment of router 212. In some embodiments, the router 212 may provide single lane communication, which may be an optical channel. As such, the router 212 may include a plurality of modulators/demodulators 280. The modulator/demodulator 280 may modulate signals to encode digital information and demodulate signals to decode the transmitted information. Each FIFO 216 of the router 212 may be operatively connected with a modulator/demodulator 280 via the first interconnector 222 and/or a wire. The modulator/demodulator 280 may be operatively connected with the second link 214 which may operatively connect one router 212 to another router 212. In certain embodiments, the second link 214 may be a channel, such as an optical channel or lane, and/or a metallic link. As such, the modulator/demodulator 280 may modulate and/or demodulate the signal data sent via the single lane communication.

Benefits of the present disclosure include higher density memory banks, capable of functioning with higher bandwidths than previously known in the art. Additional benefits include that the Network-on-Chip routing protocol may be utilized to interconnect unlimited numbers of three-dimensional memory cell matricies, spread on a die, thus allowing for reduced latencies among matricies, selective power control, unlimited memory density growth without major latency penalties, and reduced parasitic capacitance and resistance. Other benefits include a reduction in total density as compared to two-dimensional solid state memory structures utilizing a Network-on-Chip routing protocol, improved signal integrity, larger die areas, improved bandwidths and higher frequencies of operation.

Furthermore, the amount of wires, as shown with reference to FIGS. 1A and 1B, is reduced with the use of Network-on-Chip routing protocol, as shown with reference to the memory device 200 of FIG. 2B, FIG. 2C, and FIG. 2D. Due the low amount of wires across each node and the use of FIFOs 216, the memory device 200 may operate at increased frequencies as compared to the memory device shown in FIGS. 1A and 1B. Additional embodiments may include the usage of SerDes across Network-on-Chip routing protocol channels (e.g. serializers/deserializers) to use a single metal track and/or wire for each channel. Reduction to a single metal track and/or wire in any direction may further allow for embodiments containing an optoelectronic channel across the routers, and/or embodiments which interface the network to the memory with a system employing an optoelectronic channel. Optoelectronic channels may be used across the network to replace metal tracks and/or wires, thus adding a new modulation-demodulation to the interfaces.

Additionally, given the layout and hierarchy defined by the Network-on-Chip routing protocol, a prediction of the total latency of any communication in a given system, prior to fabrication, may be had. Furthermore, the final power consumption of a memory device may be accurately predicted. In addition, specific routers 212 may be activated sequentially across the path of a data packet as it travels across the network, without having to power the entire network. Additionally, the memory arrays may not require power unless the memory arrays are in use, despite any ongoing communication traffic in the memory device 200.

While the foregoing is directed to embodiments of the present disclosure, other and further embodiments of the disclosure may be devised without departing from the basic scope thereof, and the scope thereof is determined by the claims that follow.

What is claimed is:

1. A three-dimensional memory device, comprising:
  a first integrated circuit die comprising a plurality of memory arrays;
  a second integrated circuit die comprising a plurality of routers;
  a plurality of memory links, each of the memory links comprising a one-to-one connection directly connecting only a single one of the memory arrays within the first integrated circuit die to a single one of the routers within the second integrated circuit die; and
  a plurality of router links, each of the router links directly connecting a respective pair of the routers within the second integrated circuit die,
  wherein each router comprises data packet switching logic configured to route data packets to one of:
    a first one of the router links, the first router link directly connected to a first adjacent router within the second integrated circuit die,
    a second one of the router links, the second router link directly connected to a second adjacent router within the second integrated circuit die, and
    a selected one of the memory links, the selected memory link directly connecting the router within the second integrated circuit die to only a single memory array within the first integrated circuit die;
    wherein the plurality of routers within the second integrated circuit die are interconnected in a network having a network address space, and
    wherein each router is assigned a unique range of addresses of the network address space that corresponds to a memory address range of the memory array directly connected to the router.

2. The three-dimensional memory device of claim 1, wherein each router further comprises:
  a plurality of first-in first-out (FIFO) devices, wherein each FIFO device is configured to operate at a respective channel frequency.

3. The three-dimensional memory device of claim 2, wherein each router further comprises an aggregator operatively connected with at least one of the plurality of FIFO devices of the router.

4. The three-dimensional memory device of claim 1, wherein the three-dimensional memory device comprises a solid state memory device.

5. The three-dimensional memory device of claim 1, wherein each router within the second integrated circuit die is directly connected to a respective one of the memory arrays within the first integrated circuit die by a respective physical link between the first integrated circuit die and the second integrated circuit die.

6. The three-dimensional memory device of claim 1, wherein the first integrated circuit die is superposed by the second integrated circuit die such that the first integrated circuit die and the second integrated circuit die are coplanar in a first plane.

7. The three-dimensional memory device of claim 1, wherein the plurality of routers are operatively connected in a Network-on-Chip protocol.

8. The three-dimensional memory device of claim 1, wherein, in response to receiving a data packet at a router, the data packet switching logic of the router is configured to:
  determine that an address of the data packet corresponds to the unique range of addresses assigned to the router,
  subtract a base address from the address of the data packet to produce a local address within the memory address range of the memory array directly connected to the router, and
  send the data packet and the local address to the memory array directly connected to the router.

9. The three-dimensional memory device of claim 1, wherein, in response to receiving a data packet at a router, the data packet switching logic of the router is configured to:
  determine that an address of the data packet is outside of the unique range of addresses assigned to the router, and
  send the data packet to one of two or more adjacent routers directly connected to the router based on a comparison between the address of the data packet and unique network address ranges assigned to others of the plurality of routers.

10. The three-dimensional memory device of claim 1, wherein each of the memory links is configured for a unique channel between one of the memory arrays of the first integrated circuit die and one of the plurality of routers of the second integrated circuit die.

11. A multi-layer memory device, comprising:
  an integrated circuit memory die comprising a plurality of memory arrays;
  an integrated circuit interconnection die comprising a plurality of routers, wherein the plurality of routers are operatively interconnected by a plurality of router-to-router links within the integrated circuit interconnection die, each router-to-router link physically coupling a respective pair of the plurality of routers; and
  wherein each router of the plurality of routers within the integrated circuit interconnection die comprises:
    a router-to-memory link physically coupling the router to only a single one of the memory arrays within the integrated circuit memory die, such that each router within the integrated circuit interconnection die is physically coupled to only a single one of the memory arrays within the integrated circuit memory die, and each memory array within the integrated circuit memory die is physically coupled to only a single one of the routers within the integrated circuit interconnection die;
    a unique address range comprising a plurality of global addresses, each global address corresponding to a respective memory address of the single memory array physically coupled to the router by the router-to-memory link; and
    data packet switching logic configured to route data packets received at the router to one of a plurality of links in accordance with the unique address ranges of the routers, the links comprising:
      at least two of the router-to-router links, and
      the router-to-memory link of the router.

12. The multi-layer memory device of claim 11, wherein each router further comprises:

an aggregator operatively connected with the data packet switching logic; and
a plurality of first-in first-out (FIFO) devices, wherein the aggregator is operatively connected with at least one of the FIFO devices.

13. The multi-layer memory device of claim 11, wherein each router further comprises:
one or more modulators; and
one or more demodulators.

14. The multi-layer memory device of claim 11, wherein the integrated circuit memory die and the integrated circuit interconnection die are stacked in alignment with a common plane.

15. The multi-layer memory device of claim 11, wherein the integrated circuit memory die and the integrated circuit interconnection die share a same communication channel.

16. The multi-layer memory device of claim 11, wherein the multi-layer memory device comprises a solid state memory device.

17. The multi-layer memory device of claim 11, wherein the plurality of routers are interconnected in a Network-on-Chip routing protocol.

18. The multi-layer memory device of claim 11, wherein:
the plurality of routers are arranged in a grid, each router physically coupled to two or more adjacent routers within the grid by respective router-to-router links.

19. The multi-layer memory device of claim 11, wherein routing a data packet received at a router comprises:
in response to matching an address of the data packet to the unique address range of the router:
subtracting a base value from the address of the data packet to generate a memory address within a memory array range of the memory array physically coupled to the router, and
transmitting at least a portion of the data packet and the generated memory address to the memory array physically coupled to the router; and
in response to the address of the data packet being outside of the unique address range of the router:
determining a route direction for the data packet within the grid based on the unique address ranges assigned to the routers, and
transmitting the data packet to an adjacent router within the grid based on the determining, the adjacent router comprising a router physically coupled to the router in one of a north, south, east, and west direction within the grid.

20. The multi-layer memory device of claim 11, wherein a data packet is communicated across one or more of the routers within the integrated circuit interconnection die without supplying power to one or more memory arrays of the integrated circuit memory die.

21. The multi-layer memory device of claim 11, wherein each memory-to-router link comprises a unique channel between a respective one of the plurality of routers and a memory array.

22. The multi-layer memory device of claim 11, wherein each memory array of the integrated circuit memory die is powered independently.

23. A system, comprising:
a plurality of integrated circuit layers, comprising:
a first integrated circuit layer comprising a plurality of memory arrays; and
a second integrated circuit layer comprising a plurality of routers, each router comprising:
data packet switching logic; and
a plurality of first-in first-out (FIFO) circuits operatively connected with the data packet switching logic, comprising:
a first FIFO circuit operably connected to a first physical link of the router, the first physical link directly coupling the router to a first proximate router within the second integrated circuit layer,
a second FIFO circuit operably connected to a second physical link of the router, the second physical link directly coupling the router to a second proximate router within the second integrated circuit layer, and
a third FIFO circuit operably connected to a third physical link of the router, the third physical link directly coupling the router to a memory array within the first integrated circuit layer,
wherein each router within the second integrated circuit layer is directly coupled to only a single respective memory array within the first integrated circuit layer and is directly coupled to none of the others of the memory arrays within the first integrated circuit layer by physical links of the router;
wherein each router comprises a plurality of unique addresses, the unique addresses of each router corresponding to memory addresses of the only memory array within the first integrated circuit layer directly coupled to the router by the third physical link of the router; and
wherein a first router of the plurality of routers is configured to send a data packet received at the first router to a selected FIFO circuit, the FIFO circuit selected from the plurality of FIFO circuits of the first router based on an address of the data packet.

24. The system of claim 23, wherein each router further comprises an aggregator operatively connected with at least one FIFO device of the plurality of FIFO devices of the router.

25. The system of claim 23, wherein the second integrated circuit layer comprises a fabric interconnection die, and wherein the first integrated circuit layer comprises a memory array die.

26. The system of claim 23, wherein:
each router is electrically coupled to a respective memory array of the second integrated circuit layer through a respective physical link; and
each router is electrically coupled to two or more others of the plurality of routers physically adjacent to the router within the first integrated circuit layer.

27. The system of claim 23, wherein each router is operatively connected to two or more others of the plurality of routers within the first integrated circuit layer in a Network-on-Chip routing protocol.

28. The system of claim 23, wherein:
the plurality of integrated circuit layers further comprises a third integrated circuit layer comprising a plurality of memory arrays; and
the second integrated circuit layer is between the first integrated circuit layer and the third integrated circuit layer.

29. The system of claim 28, wherein each router is operatively connected with a respective memory array disposed within the third integrated circuit layer.

30. The system of claim 28, wherein the third physical link of each router directly couples the router to the memory array within the first integrated circuit layer and a memory array within the third integrated circuit layer.

31. The system of claim 23, wherein:
in response to receiving the data packet at a router, the data packet switching logic of the router is configured to:
determine whether the address of the data packet corresponds to the plurality of unique addresses of the router;
in response to determining that the address of the data packet corresponds to the plurality of unique addresses of the router:
subtract a determined value from the address of the data packet to produce a local memory address, and
send at least a portion of the data packet and the local memory address to the memory array directly coupled to the router by use of the third physical link; and
in response to determining that the address of the data packet is outside of the plurality of unique addresses of the router:
route the data packet to a selected one of the plurality of routers directly coupled to the router,
wherein the router is selected in response to comparing the address of the data packet to one or more of a row and column corresponding to a global space.

32. The system of claim 28, wherein the second integrated circuit layer is superposed by the first integrated circuit layer, and the first integrated circuit layer is superposed by the third integrated circuit layer.

33. The system of claim 23, wherein the plurality of integrated circuit layers are arranged in a stack.

34. The system of claim 23, wherein the plurality of routers are interconnected in a Network-on-Chip protocol by a plurality of physical links disposed within the second integrated circuit layer.

* * * * *